US007442425B2

(12) United States Patent
Fu et al.

(10) Patent No.: US 7,442,425 B2
(45) Date of Patent: Oct. 28, 2008

(54) HIGH POROSITY HONEYCOMB AND METHOD

(75) Inventors: Xiaodong R. Fu, Painted Post, NY (US); Jun Hou, Painted Post, NY (US); John F. Wight, Jr., Corning, NY (US)

(73) Assignee: Corning Incorporated, Corning, NY (US)

( * ) Notice: Subject to any disclaimer, the term of this patent is extended or adjusted under 35 U.S.C. 154(b) by 550 days.

(21) Appl. No.: 10/676,863

(22) Filed: Sep. 30, 2003

(65) Prior Publication Data

US 2005/0069469 A1    Mar. 31, 2005

(51) Int. Cl.
*B01D 50/00* (2006.01)
*B29C 65/00* (2006.01)
*B28B 21/00* (2006.01)
*B32B 3/12* (2006.01)

(52) U.S. Cl. .................... 428/116; 422/180; 422/177; 264/44; 264/630; 264/631; 428/117

(58) Field of Classification Search ................ 428/116, 428/118–119, 34.4, 73, 174, 178, 188, 333; 422/177, 180; 264/44, 630, 631
See application file for complete search history.

(56) References Cited

U.S. PATENT DOCUMENTS

| 4,888,317 A * | 12/1989 | DeAngelis et al. ............ 502/60 |
| 5,258,150 A | 11/1993 | Merkel et al. |
| 6,087,281 A | 7/2000 | Merkel |
| 6,159,893 A * | 12/2000 | Kondo ........................ 502/251 |
| 6,214,437 B1 | 4/2001 | Beall et al. |
| 6,432,856 B1 * | 8/2002 | Beall et al. .................. 501/118 |
| 6,506,336 B1 | 1/2003 | Beall et al. |
| 6,541,407 B2 | 4/2003 | Beall et al. |
| 2004/0152593 A1 * | 8/2004 | Cutler et al. ................ 502/439 |

FOREIGN PATENT DOCUMENTS

| EP | 0545008 | 6/1995 |
| EP | 0 753 490 | 7/1996 |
| EP | 0753490 | 1/2002 |
| EP | 1342494 | 9/2003 |
| WO | WO01/91882 | 12/2001 |

OTHER PUBLICATIONS

D. Beall et al., "Magnesium Aluminum Silicate Structures for DPF Applications", U.S. Appl. No. 10/606,708, filed Jun. 26, 2003.
G. Merkel et al., "Cordierite Ceramic Body and Method", U.S. Appl. No. 10/354,326, filed Jan. 30, 2003.

* cited by examiner

*Primary Examiner*—Timothy M. Speer
*Assistant Examiner*—Gordon R Baldwin
(74) *Attorney, Agent, or Firm*—Joseph M. Homa; Randall S. Wayland; Anca C. Gheorghiu

(57) ABSTRACT

A ceramic honeycomb substrate for use in an automotive catalytic converter system which exhibits improved light-off performance by virtue of a high porosity of 45 to 75% while still maintaining a wall thickness of greater than 2.0 mil (0.0020 inch, 0.0508 mm), preferably 2.5 mil (0.0025 in., 0.0635 mm) to 7 mil (0.0070 in., 0.1778 mm), and more preferably 2.5 mil (0.0025 in., 0.0635 mm) to 3 mil (0.0030 in., 0.0762 mm). The median pore size is in the range of 2-10 micrometers, and a coefficient of thermal expansion (CTE) (25-800° C.) of less than $15 \times 10^{-7}/°$ C.

5 Claims, 3 Drawing Sheets

HIGH POROSITY HONEYCOMB AND METHOD

BACKGROUND OF THE INVENTION

The present invention relates to ceramic bodies for use in automotive catalytic converter systems, and in particular to high porosity honeycomb substrates having reduced thermal mass and offering faster light-off performance.

The exhaust gases emitted by internal combustion systems utilizing hydrocarbon fuels, such as hydrocarbon gases, gasoline or diesel fuel, can cause serious pollution of the atmosphere. Among the many pollutants in these exhaust gases are hydrocarbons and oxygen-containing compounds, the latter including nitrogen oxides (NOx) and carbon monoxide (CO). The automotive industry has for many years attempted to reduce the quantities of pollutants from automobile engine systems, the first automobiles equipped with catalytic converter systems having been introduced in the mid 1970's.

Cordierite substrates, typically in the form of honeycomb structures, have long been preferred for use as substrates to support catalytically active components in part due to the high thermal shock resistance of such structures. Increasingly stringent regulations in recent years have been requiring higher conversion efficiencies in catalytic converters for the automotive market. Automobile emissions can be significantly reduced by controlling the light-off process. More than fifty percent of a vehicle's total emission is generated before light-off takes place.

The light-off time of a substrate is controlled to a large degree by its thermal mass; specifically, a lower thermal mass results in faster light-off times. One way to achieve a lower thermal mass is to reduce the thickness of the cell webs. Accordingly, demand for substrates having very thin webs (i.e., less than 2.5 mil (0.0025 inch, 0.0635 mm)) has dramatically increased. In addition to reduced mass, such structures may possess higher geometric surface areas, as well as lower backpressures.

Despite the advantages of thin-walled honeycomb structures, reducing the thickness of cell webs significantly diminishes the strength of the body. This causes problems during the canning process of the catalytic converter substrate. If the strength is decreased sufficiently, canning can induce a fracture of the substrate material. Further, manufacturing of such structures offers many challenges. Raw materials with smaller particle size and less contaminants are necessary to avoid screen and die plugging. Also, the extrusion pressure necessary to push the batch through a very narrow die slot may reach the limitation of the extruder.

An alternative way to reduce the thermal mass of a catalytic converter substrate is to increase the porosity while maintaining the cell density and wall thickness substantially constant. However, it is still important to maintain a low thermal expansion coefficient to prevent failures due to thermal shock. Unfortunately, high levels of porosity and low thermal expansion are known to reduce the strength of the honeycomb substrate.

Therefore, it would be considered an advancement in the art to provide a catalytic converter substrate with improved light-off performance by virtue of high porosity, while maintaining high strength and low thermal expansion, without the need for very thin cell webs. The present invention provides such a structure and method of making the same.

SUMMARY OF THE INVENTION

The invention is a high porosity ceramic honeycomb substrate for use in an automotive catalytic converter system which exhibits improved light-off performance. In one aspect the honeycomb substrate which is defined by a body having an inlet end, an outlet end, and a multiplicity of cells, is further characterized by cell walls having a thickness of greater than 2.0 mil (0.0020 inch, 0.0508 mm), preferably in the range of 2.5 mil (0.0025 in., 0.0635 mm) to 7 mil (0.0070 in., 0.1778 mm). In an aspect the inventive articles exhibit a total porosity in the range of 45 to 75%, preferably 50 to 65%, and most preferably 55%; a median pore diameter in the range of 2 to 10 micrometers, preferably in the range of 2 to 4 micrometers, and most preferably 3 micrometers. In another aspect the inventive articles exhibit a coefficient of thermal expansion (CTE) (25-800° C.) of less than $15 \times 10^{-7}/°$ C., preferably less than $10 \times 10^{-7}/°$ C. In still another aspect the inventive articles exhibit a modulus of rupture (MOR) strength, as measured on a cellular bar sample, of 200-400 psi, preferably 350 psi.

The invention is also a method for forming a high porosity ceramic honeycomb substrate for use in a catalytic converter system as described following herein. First, a batch of components is compounded, the batch being composed of ceramic powder material, a plasticizing binder system, and, a pore former having a mean particle diameter of 1 to 30 micrometers, preferably 2 to 18 micrometers. Next, the components are batched to form a plasticized mixture. The plasticized mixture is then extruded through a die to form a green honeycomb body, and then the structure is fired at a temperature and for a time sufficient to form the desired properties. Preferred embodiments of the inventive forming method are further described below.

BRIEF DESCRIPTION OF THE DRAWINGS

A complete understanding of the present invention may be obtained by reference to the accompanying drawings, when considered in conjunction with the subsequent detailed description, in which.

DETAILED DESCRIPTION OF THE INVENTION

The ceramic honeycomb substrate of the present invention combines the attractive attributes of a very thin-walled structure having a fast-light off time, as a virtue of high porosity in the range of 45 to 75%, with a more conventional substrate geometry defining cell webs having a thickness of greater than 2.0 mil (0.0020 inch, 0.0508 mm). In a preferred embodiment the porosity is preferably in the range of 50 to 65%, and most preferably 55%. In another preferred embodiment the wall thickness is between 2.5 mil (0.0025 in., 0.0635 mm) to 7 mil (0.0070 in., 0.1778 mm), and more preferably between 2.5 mil (0.0025 in., 0.0635 mm) to 3 mil (0.0030 in., 0.0762 mm).

The cell density of the inventive honeycomb is not critical, but depends on particular applications. Generally, cell densities of 400 cells/in$^2$ (62 cells/cm$^2$) to 900 cells/in$^2$ (140 cells/cm$^2$) are suitable for purposes of the present invention.

In an embodiment the inventive structure exhibits a low coefficient of thermal expansion (CTE) (25-800° C.) of less than 15×10$^{-7}$/° C., preferably less than 10×10$^{-7}$/° C. The low thermal expansion imparts the honeycomb body with a high thermal shock resistance making it suitable for use in harsh environments. In another embodiment the inventive structure demonstrates high structural strength as provided by a modulus of rupture (MOR), as measured on a cellular bar sample, of 200-400 psi, preferably 350 psi.

The ceramic material comprising the honeycomb of the present invention is not critical and can include anyone of silicates, oxides, aluminates, nitrides, borates, carbides, borides and aluminides. The invention is particularly suitable for ceramic honeycomb substrates which contain cordierite and/or mullite. Examples of such mixtures being 0-60% by weight mullite, and 30-100% by weight cordierite, with allowance for other phases, typically up to 10% by weight.

Figure 1:
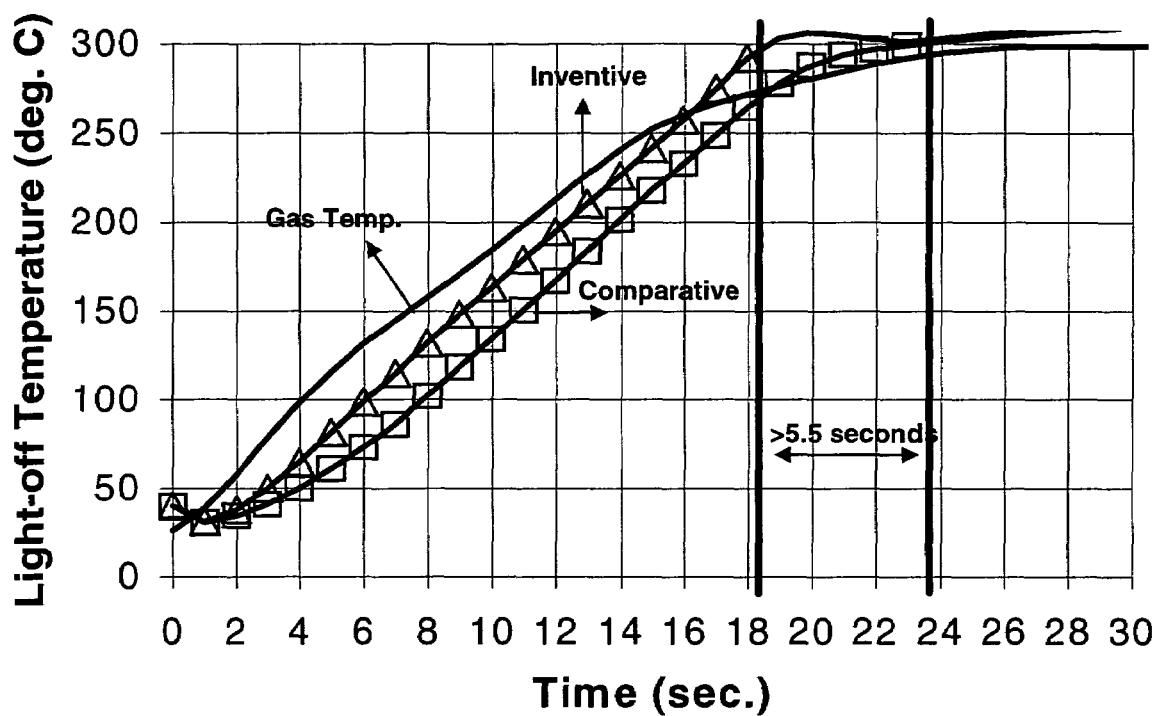
FIG. 1 is a graph based on chemical reaction modeling illustrating the predicted improved light-off time in a high porosity cordierite honeycomb substrate according to the present invention.

Using chemical reaction modeling it predicted that the light-off process can be improved by about 5.5 seconds in the inventive substrates over comparable products. Referring to FIG. 1 therein illustrated is a comparison between the light-off time of inventive and comparative cordierite substrates. Both substrates have a geometry of 900 cell/in$^2$ (140 cells/cm$^2$) and a cell wall thickness of 2.5 mil (0.0025 in., 0.0635 mm). The inventive substrate is modeled with a porosity of 63% and the comparative substrate with a porosity of 25%. As can be seen an improvement of 5.5 seconds in light-off is predicted in the inventive substrate. This is significantly faster than the equivalent comparative substrate with lower porosity.

The invention also relates to a method for forming the inventive structures. A batch of components is first compounded. The components of the batch include ceramic powder materials, a plasticizing binder system and a pore former. The invention works with a variety of inorganic ceramic powders including amorphous, crystalline or semi-crystalline material selected from the group consisting of silicate, borate or aluminate glasses or crystalline or semi-crystalline silicates, oxides, aluminates, borates, carbides, nitrides, borides and aluminides. However, particularly suitable ceramic powder materials include cordierite, spinel, clay, talc, alumina, aluminum hydroxide, silica, and oxides of calcium, magnesium, boron, titanium, germanium, and the alkali and transition metals.

Some ceramic batch material compositions for forming cordierite that are especially suited to the practice of the present invention are those disclosed in U.S. Pat. No. 6,506,336 B1 which is herein incorporated by reference in its entirety. One composition which ultimately forms cordierite upon firing is as follows in percent by weight: 33 to 41 aluminum oxide, 46 to 53 silica, and 11 to 17 magnesium oxide. Suitable cordierite-forming inorganic ceramic powder raw materials include high-purity clay, talc, silica, alumina, aluminum hydroxide, and magnesia (MgO)-yielding raw materials. The preferred cordierite-forming powder materials include kaolinite clay, talc, alumina and silica.

Suitable clays are delaminated kaolinite raw clay having a mean particle size of less than 2 micrometers, such as KAOPAQUE-10™ (K10) clay and calcined clay having a mean particle size of less than 2 micrometers and a surface area of greater than 10 m$^2$/g, such as Glomax LL™, all available from Dry Branch Kaolin. A suitable talc has a morphology index (refer to U.S. Pat. No. 5,141,686) of greater than 0.8, a mean particle size of less than 2 micrometers (measured with a Sedigraph particle analyzer) and a surface area of greater than 5 m$^2$/g, an example of which is Artic Mist™ supplied by Luzenac America.

The alumina source has a mean particle size of 5 micrometers or less, preferably 1 micrometer or less. The alumina source can be any of alumina, aluminum hydroxide, aluminum oxyhydroxide, and combinations thereof, the source preferably comprising boehmite or pseudoboehmite. A suitable alumina source includes A1000SGD™ from Alcoa and/or Dispal™ Alumina from Sasol North America, Inc. A suitable silica has a mean particle size of less than 5 micrometers, and a surface area of about 4-6 m$^2$/g, an example of which is IMSIL™ sold by Unimin Corporation.

The plasticizing binder system used in the present invention will depend in part on the composition and morphology of the ceramic powder materials of the batch. For the production of cordierite honeycombs, an aqueous binder system comprising a cellulose ether binder selected from the group consisting of methylcellulose, methylcellulose derivates and combinations thereof, a surfactant component such as stearic acid or oleic acid, an oil or oil-based component preferably a low molecular weight oil, such as polyalpholefin, and a water vehicle can provide highly plastic batches. In a preferred embodiment, the binder system comprises, based on 100 parts by weight of ceramic powder materials, 2 to 25 parts by weight of the cellulose ether binder, 0.5 to 10 parts by weight of the surfactant, 2 to 25 parts by weight of the oil, and 30 to 100 parts by weight of the water vehicle. The components of the binder system are added as super-additions such that the weight amount is computed as (mass of binder, surfactant, oil or water)/(mass of ceramic material)×100%.

In addition to the ceramic powder material and the plasticizing binder system, the batch further comprises a large amount of pore former. As with the components of the binder system, the pore former is added as a supper-addition such that the weight amount is computed as (mass of binder, surfactant, oil or water)/(mass of ceramic material)×100%. In the practice of the present invention the pore former is added in an amount of 15-85% by weight, preferably 30-70% by weight, and has a mean particle size of 2 to 18 micrometers, preferably 3 to 8 micrometers. Pore formers with a mean particle size smaller than 2 micrometers are ineffective resulting in high shrinkage rather than creating the desired porosity. Pore former with a mean particle size larger than 18 micrometers decrease the strength of the resulting fired structure.

The pore former may be any natural or synthetic material capable of forming relic pores by evaporation or degradation during firing, and can include materials such as carbon, graphite, starch, cellulose, natural and synthetic waxes. Preferably, the pore former is a wax having a high melting point of at least 70° C., such as paraffin wax, microcrystalline wax, polyethylene wax, synthetic amides, chlorinated waxes, and dispersions thereof. By "dispersion" is meant the pore former is present in a liquid environment wherein the solid loadings are less than 50 wt. %. Most preferably the pore former is polyethylene wax or a dispersion thereof. The wax pore former is removed before firing by using a vacuum or an inert atmosphere. For example the The batch components, namely the ceramic powder material, the plasticizing binder system and the pore former are mixed to form a plasticized mixture. In one embodiment, a portion of the powdered ceramic material is first mixed with a pore former dispersion to form a uniform mixture. Thereafter, the mixture is dried and screened to obtain a particulate pore forming material mixture having a composition consisting essentially of 60-85 wt. %, preferably 70 wt. %, pore former, 5-25 wt. %, preferably 15 wt. %, ceramic material and 2-20 wt. %, preferably 10 wt. % water. The remaining powdered ceramic material is then dry-blended with the binder, the resulting dry-blend then added to the particulate pore forming material mixture.

To this resulting mixture are then added the remaining components of the plasticizing binder system, namely the surfactant component, the oil or oil-based component and the water vehicle. The water content can vary depending on the type of material to impart optimum handing properties and compatibility with other components in the mixture. From a practical standpoint the water content in the practice of this embodiment is usually about 30 to 100 parts, preferably 43 parts, based on 100 parts by weight of ceramic powder materials. The wet mix is then sheared in any suitable mixer in which the batch will be plasticized. A suitable pore former dispersion is polyethylene wax dispersion, available from Michelman Inc., sold under the brand name of Michem Guard™ 10, 15, 20, 25, 55, and 60.

In another embodiment, the sinterable ceramic material, the binder and powdered pore former are first dry-mixed to form a uniform blend. Thereafter, the surfactant, oil and water vehicle are added to the resulting dry blend. The mixture may be mixed in a mixer such as a Littleford™. The water vehicle is added in an amount that is needed to plasticize the batch, typically 30 to 100 parts, preferably 43 parts, based on 100 parts by weight of ceramic powder materials. The amount of water can vary from one batch of material to another and therefore is determined by pre-testing the particular batch for extrudability. The wet mixture is then plasticized by known means. Suitable pore formers are polyethylene wax powders available from Michelman Inc., sold under the brand name of Michem Wax™ 410, 411, 436, 437, 439 and 492. Other useful pore formers include micronized polyethylene wax powders available from Honeywell, sold under the brand name of ACumist A6, A12, A18, B6, B9, B12, B18, C5, C12, C18, D5, D9, E6, E12, 3105, 3205, 3305, 1106, 1109, 1112, 1204, 1306, and 1309.

The resulting plasticized batch is then shaped, preferably by extrusion, into a green body, such as a honeycomb through a honeycomb extrusion die. Extrusion techniques are well known in the art. The honeycomb structure has an inlet and an outlet end or face, and a multiplicity of cells extending between the inlet and outlet ends. Inventive honeycomb bodies can be made with a variety of cellular densities tailored to the desired application. The present invention is particularly suitable for the formation of very high cellular densities range preferably as high as 900 cells/in$^2$ (140 cells/cm$^2$) with cell walls of greater than 2 mil (0.0020 inch, 0.0508 mm) in thickness, preferably in the range of 2.5 mil (0.0025 in., 0.0635 mm) to 7 mil (0.0070 in., 0.1778 mm), and more preferably in the range of 2.5 mil (0.0025 in., 0.0635 mm) to 3 mil (0.0030 in., 0.0762 mm).

Prior to firing the pore former is removed from the green bodies (which may be optionally first dried) by heating under a vacuum or in an inert atmosphere. In one embodiment a commercially available vacuum pyrolyzer may be used to heat up green bodies under vacuum to a temperature and for a time sufficient to substantially extract the pore former. Alternatively, the green bodies may be heated in nitrogen to a temperature and for a time to achieve substantially the same thing. For example, a suitable temperature may be 500-600° C. or higher, for a period of 12 hours or longer.

Thereafter, the bodies are fired in air to a maximum temperature of about 1400° C., with a hold of 8 hours at the maximum temperature for a total cycle time of 48 hours, or longer as needed. For compositions batched to form cordierite and/or mullite, there results the formation of a ceramic structure comprised predominately of a phase approximating the stoichiometry $Mg_2Al_4Si_5O_{18}$.

To more fully illustrate the invention the following non-limiting examples are presented below.

EXAMPLES

Comparative (non-inventive) and inventive examples are prepared by mixing together selected raw materials from Table 1 in the proportions listed in Table 2. Comparative example 1 is prepared according to the teachings of U.S. Pat. No. 6,506,336 and is absent a pore former. Inventive examples 1-4 are prepared by using a polyethylene wax dispersion to form a particulate pore forming material mixture as described above. Inventive example 5 is prepared by using a powdered polyethylene wax as the pore former.

The plasticized mixtures are extruded through a honeycomb-forming die under conditions suitable to form monoliths having a cellular density of between about 640-960 cells/in$^2$ (99-149 cells/cm$^2$) and a wall thickness of between about 2.8-4.2 mil (0.0028-0.0042 inch). The green ceramic honeycombs were sufficiently dried to remove water or other liquid phases that might be present and thereafter, first subjected to a heating in a commercially-available vacuum pyrolizer from room temperature to 500° C. over a period of 12 hours to remove the pore former, followed by a second firing from room temperature to 1400° C. with a hold of 8 hours for a cycle total time of 48 hours or longer to sinter and form the final product structure; i.e., firing conditions suitable for forming cordierite ceramic bodies.

Properties of the examples are provided in Table 2. Porosity (%) and pore size (micrometers) are measured by mercury porosimetry. Coefficient of thermal expansion along the axial direction (parallel to the length of the cell channels) is measured by dilatometry. Modulus of rupture is measured by the four-point method on cellular bar samples cut parallel to the axial direction of the filter.

It can be seen that cordierite honeycomb structures having cell with a wall thickness of greater than 2.0 mil (0.0020 inch, 0.0508 mm), a total porosity in the range of 45 to 75%, a median pore diameter in the range of 2-10 micrometers, a coefficient of thermal expansion (CTE) (25-800° C.) of less than $15 \times 10^{-7}$/° C., and a modulus of rupture (MOR) honeycomb strength in the range of 200-400 psi have been obtained.

Figure 2:
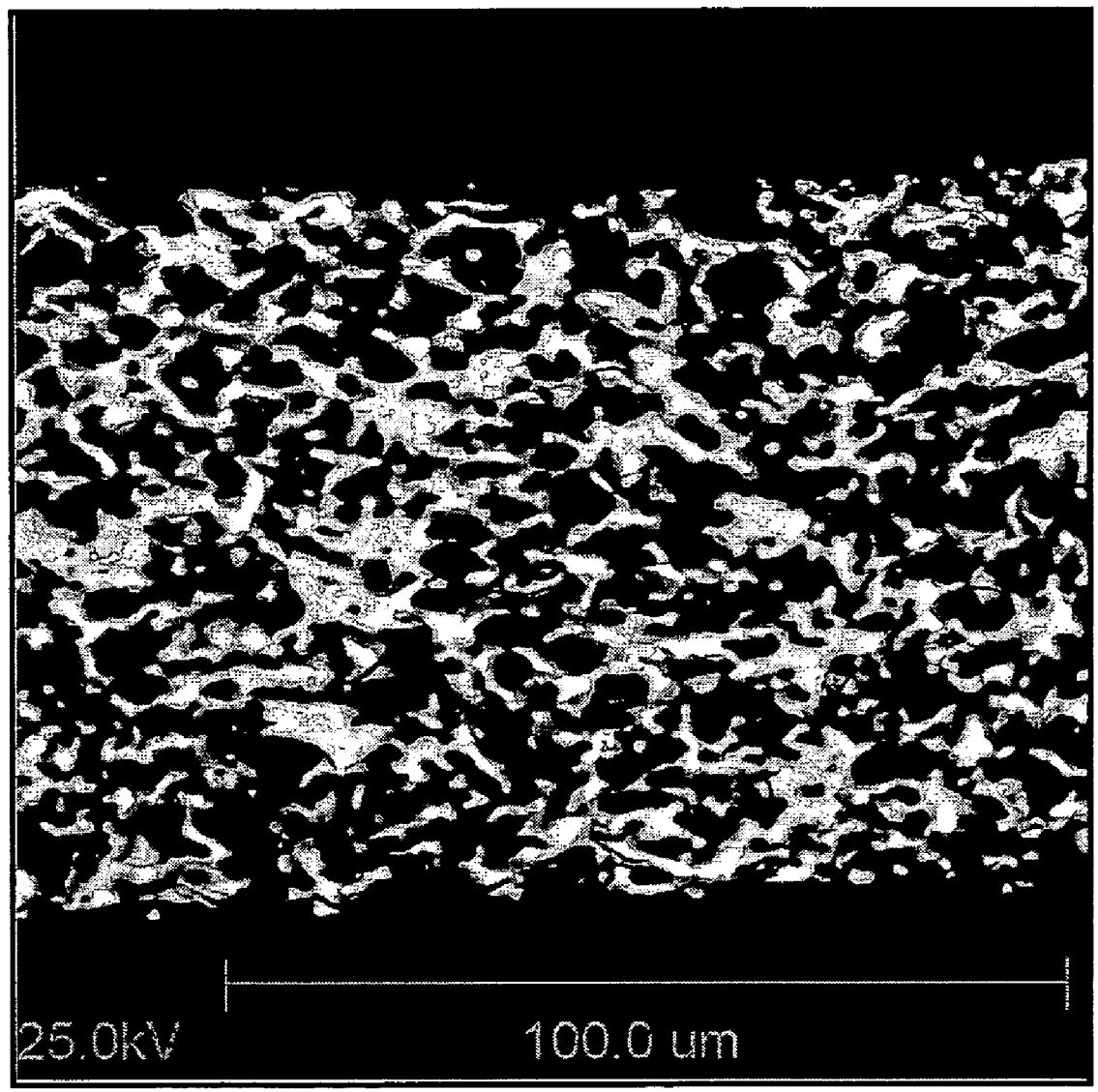
FIG. 2 is a scanning electron micrograph taken at 487× magnification of a high porosity cordierite honeycomb substrate according to the present invention; and, FIG. 3 is a scanning electron micrograph taken at 487× magnification of a commercially available cordierite honeycomb substrate.
Figure 3:
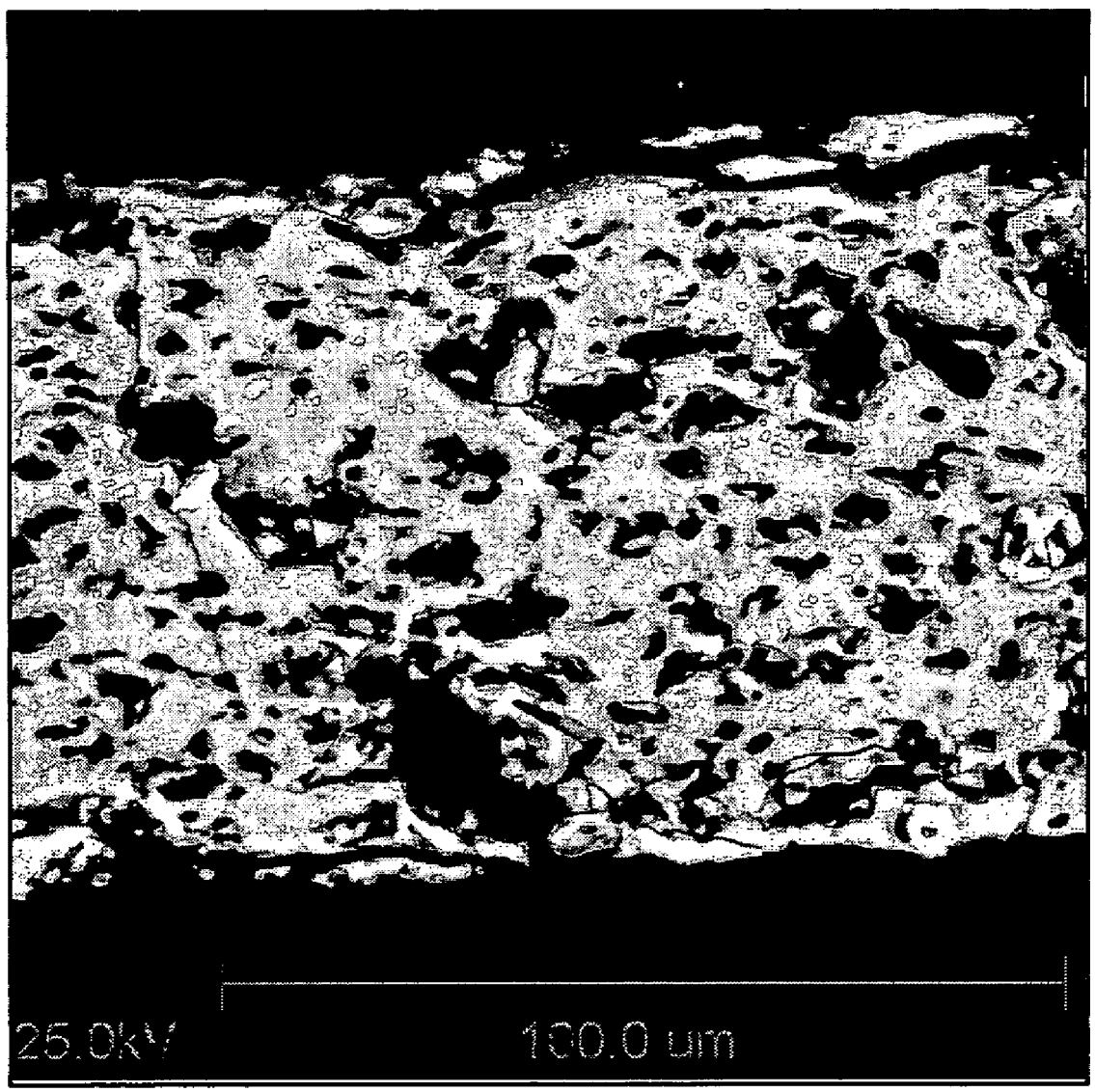

Referring now to FIG. 2 therein illustrated is a scanning electron micrograph taken at a magnification of 487×, of a polished web section of sample I4. As determined by mercury porosimetry the inventive structure of FIG. 2 reveals a high porosity of 55%, and a median pore size of 1.79 micrometers. By comparison FIG. 3 is a scanning electron micrograph taken at a magnification of 487× of a polished web section of a commercially available cordierite honeycomb body having a porosity of 33% and a median pore size of 1.3 micrometers.

It should be understood that while the present invention has been described in detail with respect to certain illustrative and specific embodiments thereof, it should not be considered limited to such but may be used in other ways without departing from the spirit of the invention and the scope of the appended claims.

TABLE 1

Ceramic Powder Materials-Composition and Properties

| Raw Material (mean particle size (mm)) | Density (g/cm$^3$) | Composition (wt. %) |
|---|---|---|
| Talc (1.6 mm) | 2.75 | 39.95 |
| Boehmite | 2.65 | 11.05 |
| Alumina | 3.98 | 5.31 |
| Calcined Clay | 2.74 | 25.66 |

TABLE 1-continued

Ceramic Powder Materials-Composition and Properties

| Raw Material (mean particle size (mm)) | Density (g/cm³) | Composition (wt. %) |
|---|---|---|
| Raw Kaolin Clay | 2.58 | 16.55 |
| Silica | 2.65 | 1.50 |

TABLE 2

Examples

| | C1 | I1 | I2 | I3 | I4 | I5 |
|---|---|---|---|---|---|---|
| | \multicolumn{6}{c}{Example Number} |
| | \multicolumn{6}{c}{Batch Composition} |
| | wt. % | wt. % | wt. % | wt. % | wt. % | wt. % |
| Ceramic Powder Materials | 100 | 100 | 100 | 100 | 100 | 100 |
| Polyethylene Wax | 0 | 80.98 | 45.77 | 25.0 | 61.1 | 79.6 |
| Methylcellulose Binder | 3.85 | 12.71 | 8.95 | 6.64 | 10.25 | 15.61 |
| Durasyn ™ Oil | 5.39 | 17.79 | 12.53 | 9.29 | 14.41 | 20.30 |
| Oleic Acid | 0.67 | 2.22 | 1.57 | 1.16 | 1.76 | 2.53 |
| Water | 25.8 | 85.2 | 60.0 | 43.74 | 41.88 | 54.5 |
| Properties | | | | | | |
| % Porosity | 33.1 | 69.3 | 61.5 | 51.6 | 55.0 | 65.9 |
| Mean Pore Size (mm) | 1.29 | 3.54 | 2.79 | 2.19 | 1.79 | 3.36 |
| MOR Strength on cellular bar (lbs/in²) | — | — | — | — | 360 | — |
| CTE, 25-800° C. ($10^{-7}$ °C.$^{-1}$) | 4.1 | 10.1 | 9.5 | 5.5 | 8.0 | 5.2 |

What is claimed:

1. A high porosity ceramic honeycomb substrate, comprising: a ceramic body having an inlet end, an outlet end, a multiplicity of cells with walls having a thickness in the range of 2.5 mil (0.0025 in., 0.0635 mm) to 3 mil (0.0030 in., 0.0762 mm), the honeycomb having a total porosity in the range of 45 to 75%, a median pore size in the range of 2-10 micrometers, and a coefficient of thermal expansion (CTE)(25-800°C.) of less than $15 \times 10^{-7}$/°C.

2. The honeycomb of claim 1, wherein the porosity is in the range of 50 to 65%.

3. The honeycomb of claim 1, wherein the median pore diameter is in the range of 2 to 4 micrometers.

4. The honeycomb of claim 1, wherein the CTE (25-800° C.) is less than $10+10-7$/° C.

5. The honeycomb of claim 1, wherein the modulus of rupture (MOR) strength of at least 200 psi.

* * * * *

UNITED STATES PATENT AND TRADEMARK OFFICE
CERTIFICATE OF CORRECTION

PATENT NO. : 7,442,425 B2 Page 1 of 1
APPLICATION NO. : 10/676863
DATED : October 28, 2008
INVENTOR(S) : Xiaodong Robert Fu et al.

It is certified that error appears in the above-identified patent and that said Letters Patent is hereby corrected as shown below:

| Col. | Line | Description |
| --- | --- | --- |
| 8 | 31 | "10+10-7/°C" should read --$10 \times 10^{-7}$/°C--. |

Signed and Sealed this

Fifteenth Day of December, 2009

David J. Kappos
*Director of the United States Patent and Trademark Office*